(12) United States Patent
Flusberg et al.

(10) Patent No.: US 7,646,795 B2
(45) Date of Patent: Jan. 12, 2010

(54) METHODS AND APPARATUS FOR MAINTAINING A QUALITY OF A RAMAN MEDIUM IN A RAMAN CONVERSION CELL

(75) Inventors: Allen Flusberg, Newton, MA (US); James Moran, Charlestown, MA (US); Paul Lewis, North Reading, MA (US)

(73) Assignee: Science Research Laboratory, Somerville, MA (US)

( * ) Notice: Subject to any disclaimer, the term of this patent is extended or adjusted under 35 U.S.C. 154(b) by 889 days.

(21) Appl. No.: 10/301,557

(22) Filed: Nov. 21, 2002

(65) Prior Publication Data

US 2003/0151798 A1    Aug. 14, 2003

Related U.S. Application Data

(60) Provisional application No. 60/332,159, filed on Nov. 21, 2001.

(51) Int. Cl.
*H01S 3/30* (2006.01)
*G02F 1/35* (2006.01)

(52) U.S. Cl. .............................. 372/30; 372/39; 372/51

(58) Field of Classification Search ............... 372/3, 372/39, 51, 30
See application file for complete search history.

(56) References Cited

U.S. PATENT DOCUMENTS 3,793,541 A * 2/1974 Ashkin et al. ............... 372/3
4,103,179 A * 7/1978 Schmidt ..................... 359/327
4,194,170 A * 3/1980 Kurnit ........................... 372/3
4,973,157 A * 11/1990 Krasinski et al. ............. 356/246
5,090,016 A * 2/1992 Dewhirst et al. .............. 372/3
5,180,378 A * 1/1993 Kung et al. ................... 606/10
5,375,131 A * 12/1994 Pocholle et al. .............. 372/3
5,414,723 A * 5/1995 Krapchev ..................... 372/3
6,111,905 A * 8/2000 Wickstrom ................... 372/59

OTHER PUBLICATIONS

Kung, R.T.V. et al. Phase Front Reproduction in Raman Conversion. IEEE J. Quant. Elec. QE-18(8), Aug. 1982, 1306-1310.
Parazzoli, C.G. et al. Numerical and Experimental Investigation of a Stimulated Raman Half Resonator. IEEE J. Quant. Elec. 24(6), Jun. 1988, 872-880.

* cited by examiner

*Primary Examiner*—David Hung Vu
(74) *Attorney, Agent, or Firm*—Burns & Levinson LLP; Jerry Cohen; Orlando Lopez

(57) ABSTRACT

Methods and apparatus for maintaining a quality of a Raman medium in a Raman conversion cell. In various examples, a flow velocity of the Raman medium is tailored based on a spatial nonuniformity of heat deposition resulting from the Raman conversion in the cell. In particular, in one example, the flow velocity of the Raman medium may be tailored to be higher where the heat deposition/temperature rise is larger and smaller elsewhere in the cell. This type of flow velocity profile reduces the overall required volumetric flow of the Raman medium in the cell without significantly affecting a quality of the Raman medium.

20 Claims, 5 Drawing Sheets

METHODS AND APPARATUS FOR MAINTAINING A QUALITY OF A RAMAN MEDIUM IN A RAMAN CONVERSION CELL

CROSS REFERENCE TO RELATED APPLICATION

This applications claims the benefit, under 35 U.S.C. §119(e), of U.S. Provisional Application Ser. No. 60/332,159, filed Nov. 21, 2001, entitled "Methods and Apparatus for Maintaining a Quality of a Raman Medium in a Raman Conversion Cell," which application hereby is incorporated herein by reference.

FIELD OF THE INVENTION

The present invention relates to Raman cells. More specifically, the invention is directed to methods and apparatus for maintaining a quality of a Raman medium in a Raman conversion cell.

BACKGROUND

Stimulated Raman scattering, or Raman conversion, is a process that amplifies radiation at a "Stokes" wavelength $\lambda_S$ at the expense of radiation at a shorter "laser" wavelength $\lambda_L$ in the presence of a Raman medium. In particular, in Raman conversion, a single photon of wavelength $\lambda_S$ is created for each photon of wavelength $\lambda_L$ that is annihilated in the Raman medium. The energy difference between these two photons appears as excitation of the Raman medium, whose molecules or atoms are excited by this process from a lower to a higher energy state. As the excitation is thermalized, the excitation energy is transformed into heat.

In Raman conversion, the conversion rate from $\lambda_L$ to $\lambda_S$ in the Raman medium is proportional to the product of the laser and Stokes radiation beam intensities (each measured, for example, in $W/cm^2$). Therefore, the heating rate at any given point in the Raman medium is also proportional to the product of these two intensities, being small where the intensity product of the beams is small and, conversely, large where the intensity product of the beams is large. Since the heating typically is not uniform, it may cause deleterious effects such as thermal lensing of the radiation beams.

SUMMARY OF THE INVENTION

One embodiment of the present invention is directed to a method of operation for a Raman conversion cell containing a fluid Raman medium. The method of this embodiment comprises an act of reducing a total volumemetric flow of the fluid Raman medium through the Raman conversion cell while maintaining a quality of the fluid Raman medium.

Another embodiment of the present invention is directed to a method for maintaining a quality of a fluid Raman medium in a Raman conversion cell. The method of this embodiment comprises an act of varying a flow velocity of the fluid Raman medium based on a non uniform heat deposition in the Raman conversion cell.

Another embodiment of the present invention is directed to an apparatus, comprising a Raman conversion cell configured to contain a fluid Raman medium flowing therethrough. The Raman conversion cell is further configured to reduce a total volumetric flow of the fluid Raman medium through the Raman conversion cell while maintaining a quality of the fluid Raman medium.

In one aspect of the foregoing embodiments, the flow velocity of the fluid Raman medium is varied based on the product of an intensity of a laser wavelength and an intensity of a Stokes wavelength that both pass through the Raman medium. In another aspect, the flow velocity of the fluid Raman medium is increased based on an increase of the product of the Stokes wavelength and laser wavelength intensities.

In yet another aspect, the Stokes wavelength and the laser wavelength propagate together as essentially collinear beams through the fluid Raman medium and the collinear beams make N passes through the fluid Raman medium. In this aspect, the flow velocity of the fluid Raman medium is varied for n passes of the collinear beams, n being less than N. For example, in one aspect, the flow velocity of the fluid Raman medium may be varied for the last n passes of the collinear beams through the fluid Raman medium. A further aspect of this embodiment includes increasing the flow velocity of the fluid Raman medium for the last n passes. For example, in one aspect, N=at least 25 and n=5 (i.e., the flow velocity of the fluid Raman medium is increased for the last 5 passes).

In another embodiment of the present invention, a Raman conversion cell has at least a first region and a second region occupied by the fluid Raman medium, wherein the nonuniform heat deposition is greater in the first region than in the second region. In one aspect of this embodiment, the flow velocity of the fluid Raman medium is increased in the first region with respect to the second region.

For example, in one embodiment, a Stokes wavelength and a laser wavelength propagate together as essentially collinear beams along at least one path length through the fluid Raman medium, and the collinear beams are focussed to at least one focal region along the path lengths. In one aspect of this embodiment, the flow velocity of the fluid Raman medium is increased at least in the focal region. In another aspect, the focal region is approximately at a center of the path length, and the flow velocity of the Raman medium is sheared such that the flow velocity peaks at approximately the center of the path length and decreases away from the center of the path length.

Another embodiment of the present invention is directed to a Raman cell that comprises a cavity through which at least one radiation beam travels. The cavity includes a first segment coupled to a second segment, wherein the first segment has a first width smaller than a second width of the second segment. In one aspect of this embodiment, the Raman cell includes a first flow ducting and a second flow ducting that define the first width and the second width, respectively. In yet another aspect, the Raman cell includes a bulkhead that separates the first and second segments.

Another embodiment of the present invention is directed to a Raman cell that comprises a cavity having a first portion and a second portion separated by a divider. In one aspect of this embodiment, first radiation passes through the first portion of the cavity and second radiation passes through the second portion of the cavity, wherein the first portion has at least one smaller dimension than a dimension of the second portion.

It should be appreciated the all combinations of the foregoing concepts and additional concepts discussed in greater detail below are contemplated as being part of the inventive subject matter disclosed herein. In particular, all combinations of claimed subject matter appearing at the end of this disclosure are contemplated as being part of the inventive subject matter.

DETAILED DESCRIPTION

Figure 1:
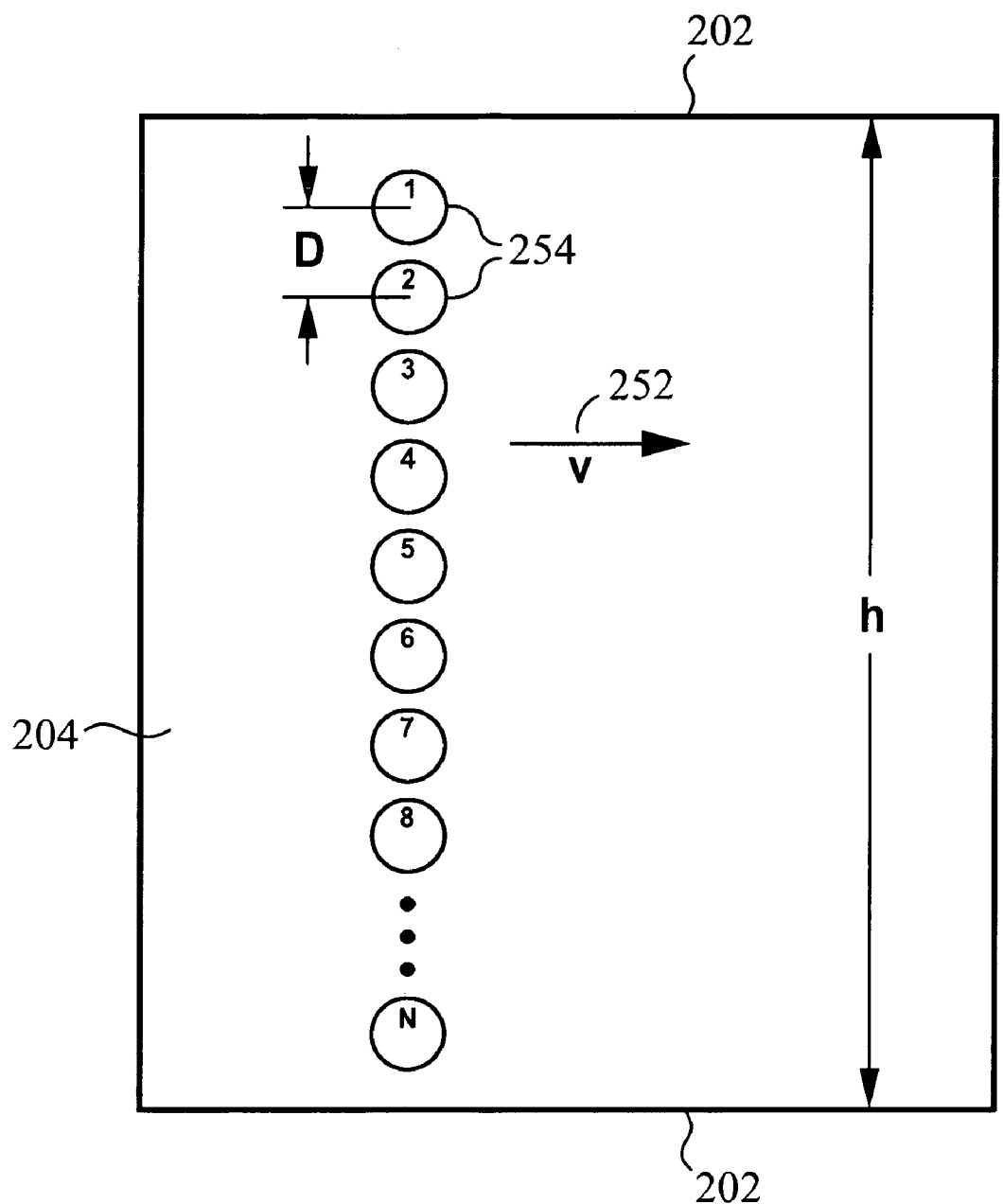
FIG. 1 is a diagram showing a cross-section of a portion of a Raman cell according to one embodiment of the present invention.

One embodiment of the present invention is directed generally to methods and apparatus for reducing an overall volumetric flow of a Raman medium in a Raman conversion cell, while effectively removing heat generated by Raman conversion in the Raman medium. With effective heat removal, an overall quality of the fluid Raman medium may be maintained to facilitate sufficient Raman conversion of radiation beams, and/or beam quality, while at the same time conserving the resource of the Raman medium due to the reduced flow.

In particular, in one embodiment, a geometry for a Raman conversion cell is considered in which laser and Stokes radiation beams, propagating together, are reflected by mirrors back and forth through a Raman medium and, on each pass, are focused in some region of the Raman cell. Both of these features (i.e., multiple passes and focussed beams) increase the conversion for a given length (i.e., radiation beam path length) of the Raman cell. The multiple pass and focussed beam configuration utilized in this embodiment is similar to a conventional multipass geometry that has been used to convert $\lambda_L \cong 10$ µm to $\lambda_S \cong 16$ µm in gaseous hydrogen or parahydrogen, for example. However, it should be appreciated that this exemplary configuration is for purposes of illustration only and that the invention is not limited in this respect, as other implementations are possible as discussed further below.

Applicants have recognized and appreciated that the nonlinearity of the Raman conversion process causes potentially deleterious heat deposition in the Raman medium to be nonuniform. More specifically, Applicants have recognized and appreciated that there are at least two aspects of the spatial nonuniformity of the heat deposition in the Raman medium, one intrinsic and the other geometry dependent.

For example, first, it is intrinsic to the Raman conversion process that the density of molecules excited to a higher energy level is proportional to the product of the laser and Stokes beam intensities. Since the Raman process amplifies the Stokes beam and attenuates the laser beam, this product generally is not uniform throughout the Raman cell. In particular, in a multipass geometry, this product varies from one pass to the next. Second, the geometry of a focussed beam configuration in a Raman cell creates another possible nonuniformity in the laser-Stokes intensity product along the radiation path in the cell. The concepts discussed further below take into consideration both of these spatial nonuniformities (i.e., from pass to pass, and along the radiation path length).

For example, in one embodiment of the present invention, a local flow velocity of the Raman medium in the Raman cell is tailored to the local heat deposition rate, which is proportional to the molecular excitation rate. In one aspect of this embodiment, optimizing this tailoring can in some cases reduce the overall volumetric flow of the medium through the cell by a significant factor (e.g., 4-5), as compared to the volumetric flow required to effectively remove heat from the medium at a uniform flow velocity through the medium (i.e., in which the "hottest" regions are flowed at the same rate as other regions of the cell).

As discussed above, the Stokes intensity is initially small and grows rapidly with distance as the Stokes beam propagates through the Raman medium together with the laser beam. Since the heating rate is proportional to the product of laser and Stokes intensities, the heating generally is concentrated at the end of the propagation path (e.g., on the last few passes of a multipass geometry). In view of the foregoing, according to one embodiment of the invention, the Raman medium is flowed more rapidly in the volume of the last few passes of the beams through the medium, while the medium is flowed less rapidly in the volume of the previous passes (for which the heating generally is smaller). According to another embodiment of the invention, the Raman medium is flowed more rapidly through a focal region of the Raman medium in the vicinity of the focussed radiation beams.

Following below are more detailed descriptions of various concepts related to, and embodiments of, methods and apparatus according to the present invention. It should be appreciated that various aspects of the invention, as discussed above and outlined further below, may be implemented in any of numerous ways, as the invention is not limited to any particular manner of implementation. Examples of specific implementations are provided herein for illustrative purposes only.

FIG. 1 is a diagram showing a cross-section of a portion of a Raman cell cavity 204 through which collinear laser and Stokes beams pass multiple times, according to one embodiment of the present invention. In FIG. 1, the portion of the illustrated cavity 204 is outlined by flow ducting 202. A diameter of each successive pass of collinear laser and Stokes beams 254 (shown in cross-section in FIG. 1 as directed into and out of the plane of the figure) is denoted by d, and a distance between the centers of successive beam passes is denoted by D. The successive beam passes shown in FIG. 1 are numbered sequentially in reverse chronological order, with the first pass numbered N and the last pass numbered 1. A flow velocity 252 of the Raman medium also is indicated in FIG. 1 by the letter v, and a first dimension of the cavity is indicated by the letter h. It should be appreciated that the direction of the flow velocity 252 is shown in FIG. 1 for purposes of illustration only, and that the direction of flow velocity with respect to the beam passes may be different than that shown in FIG. 1, as discussed further below in connection with other embodiments.

In one embodiment directed to a multi-pass Raman cell configuration as shown in FIG. 1, for purposes of illustration it is assumed that the laser and Stokes beams make N=25 passes through the Raman medium, and that heating of the medium is considered to be significant only on the last n=5 passes. In this example, for non-overlapping passes, the flow velocity v required to clear the heated volume of the Raman medium 252 between laser pulses is $$v = U(\Delta T) \nu\, d,$$

where $U(\Delta T)$ is a dimensionless function of the local temperature rise $\Delta T$ due to the heat deposition on a single pulse, and $\nu$ is the pulse repetition rate of the laser. For example, wherever $\Delta T$ is large enough to significantly affect beam quality, $U \cong 1$.

As is shown in FIG. 1, for a uniform flow of the Raman medium 252 (e.g., the same for all passes of the laser), an overall volumetric flow F of the medium is given essentially by $$F = vhL = vNDL = \nu NDLd\, U(\Delta T),$$

where h is the indicated dimension of the cavity and L is the cell length (i.e., the radiation beam path length) along a direction perpendicular to the cell cross-section shown in FIG. 1. In the geometry of FIG. 1, from the foregoing equation, the overall volumetric flow is seen to be proportional to the total number of passes N. This is because in the present example, all of the gas is flowed at the flow rate that is required to remove the heat from those passes (e.g. the last or last few passes) where the heat deposited per pulse is highest.

As stated above, however, the actual heat deposition (and temperature rise $\Delta T$) is proportional to the intensity product of the collinear laser and Stokes beams, and is therefore typically concentrated in a much smaller number of passes. In particular, Applicants have appreciated and recognized that the intensity product typically is peaked at the last, or one of the last passes (depending on the degree of laser photon depletion). Working backwards from the pass at which the intensity product takes on its maximum value, the intensity product is reduced by a factor of approximately 3-5 from one pass to the previous one. While the portion of the Raman medium that sees the highest intensity product (e.g., one or several beam diameters between pulses with $U \gtrsim 1$) may be flowed rapidly by comparison, the portion of the Raman medium that sees a low intensity product can be flowed more slowly, since the heat deposited in it is smaller.

On this basis, one embodiment of the invention is directed to using a geometry for a Raman cell in which the Raman medium is flowed at higher velocity v for passes with larger heat deposition. For example, in one embodiment, the Raman cell may be divided into regions or sections with high flow velocity of the medium in one or more sections of the cell and a relatively lower flow velocity of the medium elsewhere in the cell. In one aspect of this embodiment, the cell is particularly adapted such that n radiation beam passes of the N total passes (e.g., 5 passes out of 25 total passes) generating the greatest heat propagate through the section(s) having the highest flow of the medium. In this manner, since typically n<<N, the overall volumetric flow of the medium through the cell can be reduced significantly (e.g., by a factor that depends on the value of n and N). In one embodiment, this factor may be as much as approximately 4 to 5.

In the foregoing discussion, it should be appreciated that the values of N=25 and n=5 for multi-pass configurations are provided for purposes of illustration only, and that the invention is not limited in this respect, as single-pass or other multi-pass cell configurations are possible according to other embodiments.

Figure 2A:
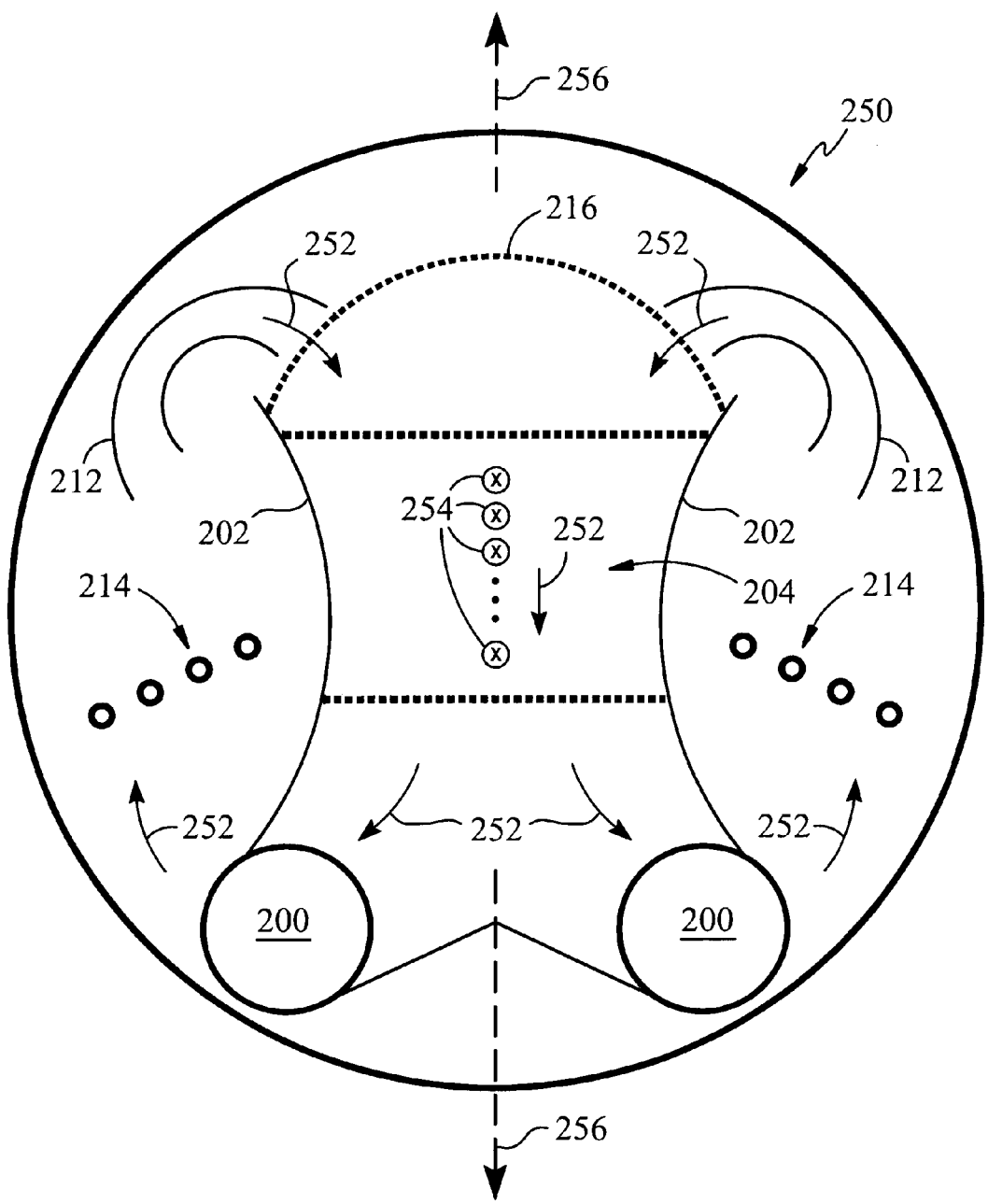
FIG. 2A is a diagram illustrating a cross-section of a Raman cell according to one embodiment of the present invention.

FIG. 2A shows a cross-section of a Raman cell 250 according to one embodiment of the present invention. In the embodiment of FIG. 2A, fans 200 flow a Raman medium 252 through the cell 250. Heat exchangers 214 remove heat from the medium 252 as it flows by the exchangers. The Raman medium flowing from fans 200 also passes through turns 212, through conditioner 216, and between flow ducting 202.

In one aspect of the embodiment shown in FIG. 2A, the flow ducting 202 defines lateral bounds of a cavity 204 through which collinear laser and Stokes radiation beams 254 pass. In the drawing of FIG. 2A, the collinear laser and Stokes beams pass into and out of the plane of the cross-section of the cell 250. In one aspect of this embodiment, the cavity 204 and the beam travel through it may be viewed similarly to those illustrated in FIG. 1 (in which the cavity 204, the Raman medium 252, the beams 254, and a portion of the flow ducting 202 also are indicated).

For purposes of illustration in FIG. 2A, approximate upper and lower bounds of cavity 204 are indicated by dotted lines. It should be appreciated, however, that the cavity 204 need not have specifically delineated upper and lower bounds, and may have a variety of dimensions (e.g., heights and widths). For example, in one aspect of this embodiment, the radiation cavity 204 within the Raman cell 250 shown in FIG. 2A may be defined generally at least in part by a volume of the cell in the immediate vicinity of where one or more radiation beams pass or are anticipated to pass through the cell.

One aspect of the embodiment shown in FIG. 2A is the curvature of the flow ducting 202. In particular, a volume of the Raman medium between the ducting 202 is smaller where the ducting is closer together (e.g., near a "waist" or necked-down section of the ducting), and larger where the ducting 202 is further apart. Consequently, the flow velocity of the Raman medium through the ducting 202 generally is higher in the regions where the volume is less, and lower in the regions where the volume is larger. In one embodiment of the present invention, the beam passes 254 are arranged such that a first group of the total N passes travels through a region where the spacing of flow ducting 202 is greater (e.g. nearer to the conditioner 216 shown in FIG. 2A), and a second group of n passes, those for which heating is more significant, travel through a region in which the spacing of ducting 202 is smaller (e.g., near the "waist" of the ducting). In this manner, the Raman medium 252 has a greater flow velocity in the locality of greater heat deposition.

One possible issue in connection with the implementation shown in FIG. 2A relates to a potential turbulence of the Raman medium 252 near the top (and bottom) of cavity 204, due in part to the confluence of two flow streams exiting from the turns 212 (and entering the fans 200). However, it is believed that any turbulence generated in these regions does not significantly affect the quality of the Raman medium or the efficiency of the Raman conversion.

Figure 2B:
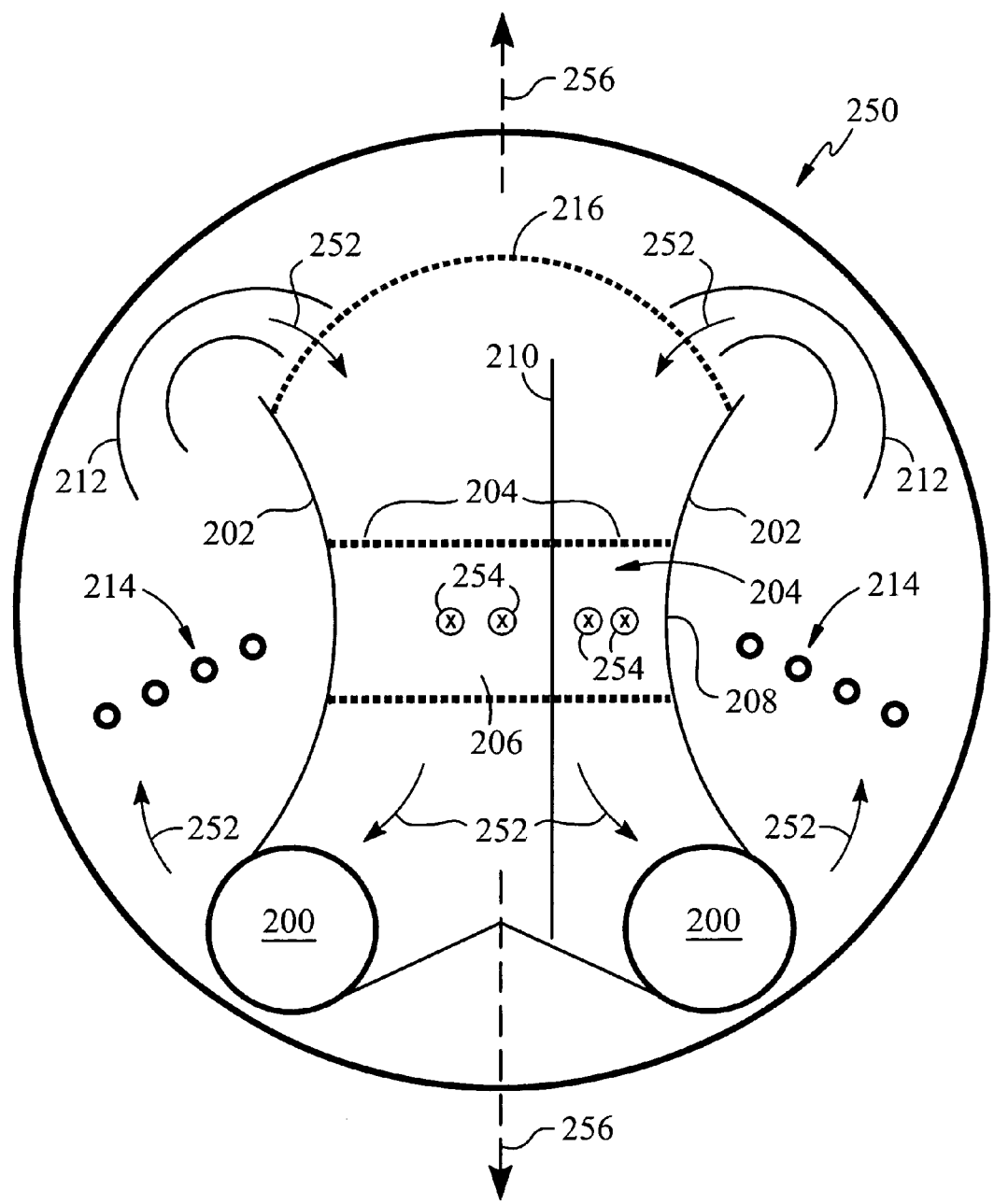
FIG. 2B is a diagram illustrating a cross-section of a Raman cell according to another embodiment of the present invention.

According to another embodiment, as shown in FIG. 2B, the cavity 204 may be subdivided into subcavities 206 and 208 by a divider 210. In one aspect of this embodiment, the cavity 204 and beam travel through it may be similar to those illustrated in FIG. 1 (oriented 90° clockwise from the illustration of FIG. 1). In FIG. 2B, the divider 210 is shown in a vertical position slightly to the right of a vertical axis 256 of the Raman cell 250. It should be appreciated, however, that according to other embodiments, the divider 210 may take on a variety of orientations and/or positions within the Raman cell 250, as the invention is not limited in this respect.

In FIG. 2B, the subcavity 208 is shown smaller than the subcavity 206. In one aspect of this embodiment, the laser and Stokes radiation beams 254 travel through cavity 204 making N passes substantially normal to the plane of FIG. 2B. According to one embodiment, a first group of the N total passes of the radiation beams is directed through subcavity 206, while a second group of n<<N passes, those for which the heating is more significant, pass through subcavity 208. By reducing the volume of subcavity 208 with respect to that of subcavity 206 through the introduction of the divider 210, the Raman medium flows more rapidly in the subcavity 208 than in the subcavity 206 (due to the asymmetrically positioned divider 210), thereby effectively removing heat in the region in which it is generated most.

According to yet another embodiment, a reduction in the overall volumetric flow of the Raman medium in the Raman cell also can be obtained by taking into consideration the heating nonuniformity along the radiation beam path of the Raman cell. For example, as discussed above, the intensity product and the corresponding heat deposition in a focused beam Raman cell generally is not uniform along the cell length in the direction of beam propagation; rather, it is largest near the focal region (e.g. the center) of the cell. In view of the foregoing, according to one embodiment of the present invention, the flow velocity of the Raman medium can be sheared so that it peaks in the focal region of the cell and is lower away from the focal region. In one aspect, the precise factor by which the velocity may be sheared takes into account the fact that the beams are larger in diameter where the intensity product is lower.

For example, with reference again to FIG. 1 and the equations set forth above, the dependence of U on the intensity product is linear where $\Delta T$ is small, and hence U is proportional to $1/d^4$ and v is proportional to $1/d^3$. In a typical case, d may be a factor of approximately three larger at the cell ends than at the cell center in a focused beam arrangement. Accordingly, it is estimated that a shear of the flow velocity as discussed above allows the overall volumetric flow of the Raman medium to be reduced by an additional factor of approximately three from that of a cell having a non-sheared flow velocity.

Figure 3:
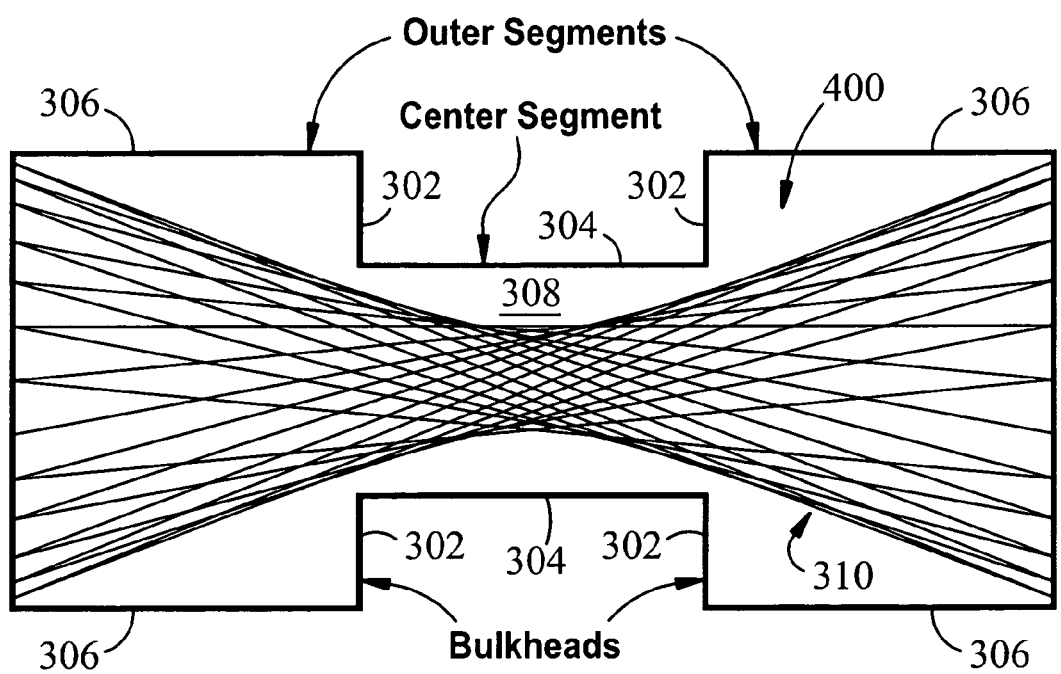
FIG. 3 is a diagram showing a top view of a portion of a Raman cell including a radiation cavity, according to one embodiment of the present invention.
Figure 4:
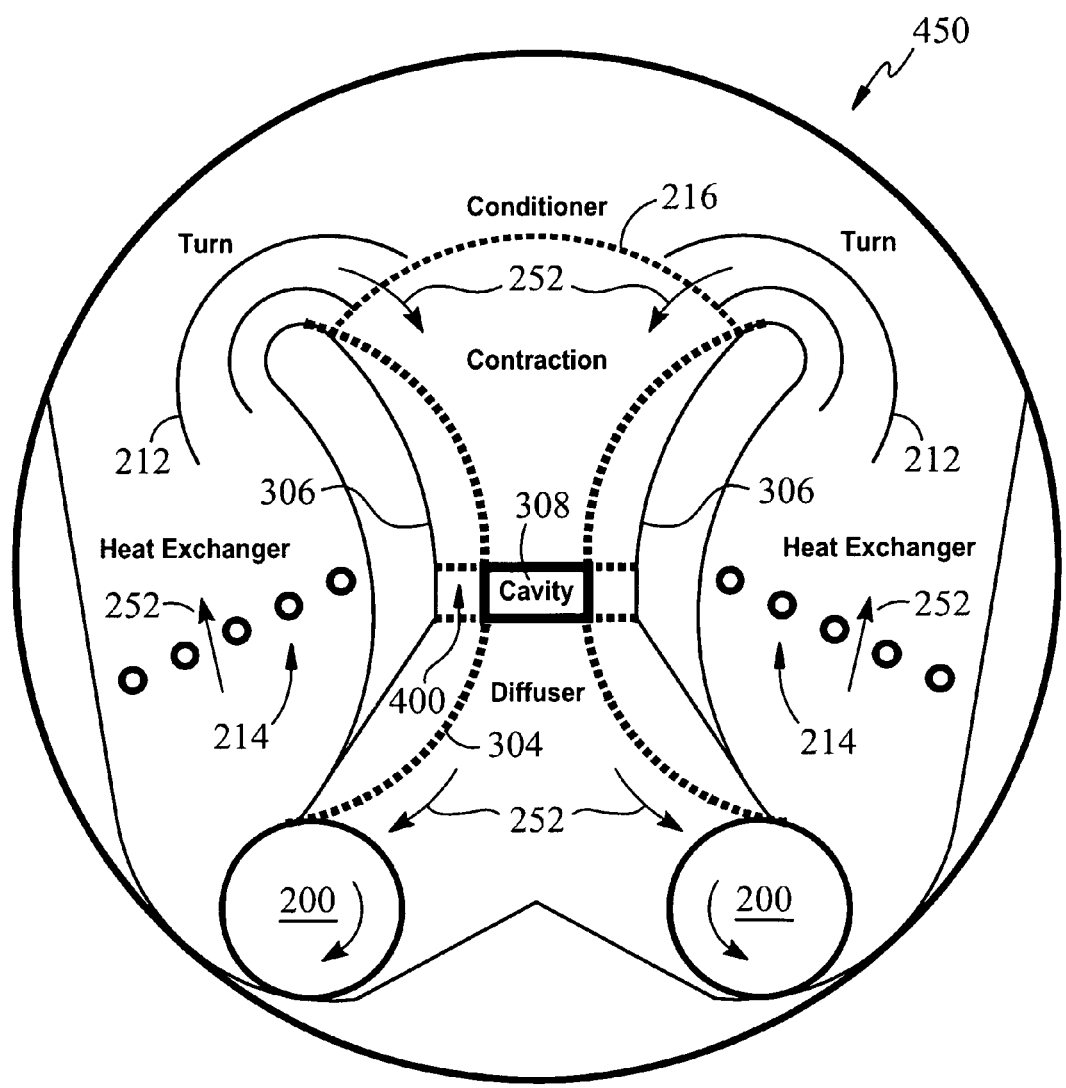
FIG. 4 is a diagram showing a cross-section of a Raman cell that incorporates the radiation cavity of FIG. 3, according to yet another embodiment of the present invention.

One example of an embodiment of the present invention implementing sheared flow velocity of a Raman medium is shown in FIGS. 3 and 4. A top view of a portion of a Raman cell including a radiation beam cavity 400 is shown in FIG. 3, in which an exemplary array 310 of twenty-five beams pass between spherical reflectors (not shown). In this embodiment, each beam of the array 310 is focused at approximately the cavity center so that the predominant heating along the last few passes occurs in the central region 308 of the cavity 400. It should be appreciated, however, that the invention is not limited to focussing the beams near the center of the cavity, as other implementations are possible according to other embodiments.

In the embodiment illustrated in FIG. 3, a flow of the Raman medium, perpendicular to the plane of the figure, is divided into three sections. A central section 308 of the cavity 400 has a cross-section that is narrowed so that, at a constant volumetric flow rate, the flow velocity of the medium in the central section of the cavity is proportionately increased.

FIG. 4 shows an example of a Raman cell 450 incorporating the cavity 400 illustrated in FIG. 3. In one aspect of the embodiment shown in FIG. 4, the bulkheads 302 shown in FIG. 3 separate the Raman cell 450 into the three sections which are pierced by the fans 200, the heat exchangers 214 and the beam array 310. A common assembly of two fans 200 clears all three cell sections, and flow ducting on approach and on exit to the cavity is made to conform to the selected widths. An increase in flow velocity by a factor of two in the central section 308 over that of the outer sections may be achieved with moderate increase in fan power demand of less than 50%. This same increase in flow velocity over a cavity of uniform width (i.e., uniform non-sheared flow velocity of is the medium) would require an increase by a factor of approximately eight in fan power.

Referring to FIGS. 3 and 4, the laser and Stokes radiation beams 310 shown in FIG. 3 propagate along cavity 400 as shown in FIG. 4 in passes substantially normal to the plane of FIG. 4 (the beams 310 are not shown explicitly in FIG. 4). Near center segment 308, the radiation beams are focused in order to travel between ducting 304 (indicated in dotted lines in FIG. 4); in other parts of cavity 400 the radiation is bound by ducting 306, which is spaced wider than ducting 304. As in FIGS. 2A and 2B, fans 200 circulate the Raman medium 252, drawing the medium 252 down from conditioner 216, through cavity 400, and blow the medium up through heat exchangers 214 and turns 212. Although cavity 400 is shown for purposes of illustration in FIG. 4 as having upper and lower bounds, it should be appreciated that no upper and lower bounds need be specifically delineated, as discussed above in connection with FIGS. 2A and 2B. As discussed above in connection with FIG. 3, the narrowed central section 308 of the cavity 400 causes an increase in the flow velocity of the medium in the central section, where the beams are focused.

Having thus described at least one illustrative embodiment of the invention, various alterations, modifications, and improvements will readily occur to those skilled in the art. Such alterations, modifications, and improvements are intended to be within the spirit and scope of the invention. While some examples presented herein involve specific combinations of functions or structural elements, it should be understood that those functions and elements may be combined in other ways according to the present invention to accomplish the same or different objectives. In particular, acts, elements and features discussed in connection with one embodiment are not intended to be excluded from a similar role in other embodiments. Accordingly, the foregoing description is by way of example only, and is not intended as limiting.

What is claimed is:

1. In a Raman conversion cell containing a fluid Raman medium, a method comprising an act of:
    a) reducing a volumetric flow of the fluid Raman medium through the Raman conversion cell while maintaining a quality of the fluid Raman medium by varying a local flow velocity of the fluid Raman medium based on a local non-uniform heat deposition in the Raman conversion cell.

2. In a Raman conversion cell containing a fluid Raman medium, a method comprising an act of:
    a) reducing a total volumetric flow of the fluid Raman medium through the Raman conversion cell while maintaining a quality of the fluid Raman medium;
    wherein the act a) comprises an act of:
    a1) varying a flow velocity of the fluid Raman medium based on a non-uniform heat deposition in the Raman conversion cell; and
    wherein a Stokes wavelength and a laser wavelength each passes through the fluid medium, wherein the non-uniform heat deposition is proportional to a product of a first intensity of the Stokes wavelength and a second intensity of the laser wavelength, and wherein the act a1) includes an act of: b) varying the flow velocity of the fluid Raman medium based on the product of the first intensity and the second intensity.

3. The method of claim 2, wherein the act b) includes an act of: increasing the flow velocity of the fluid Raman medium based on an increase of the product of the first intensity and the second intensity.

4. The method of claim 2, wherein the Stokes wavelength and the laser wavelength propagate together as essentially collinear beams through the fluid Raman medium, wherein the collinear beams make N passes through the fluid Raman medium, and wherein the act b) includes an act of: c) varying the flow velocity of the fluid Raman medium for n passes of the collinear beams, n being less than N.

5. The method of claim 4, wherein the product of the first intensity and the second intensity varies with each pass of the N passes, and wherein the act c) includes an act of: d) varying the flow velocity of the fluid Raman medium for the last n passes of the collinear beams through the fluid Raman medium.

6. The method of claim 5, wherein the product of the first intensity and the second intensity increases for at least the last n passes of the collinear beams through the fluid Raman medium, and wherein the act d) includes an act of: e) increasing the flow velocity of the fluid Raman medium for the last n passes.

7. The method of claim 6, wherein N=at least 25 and n=5, and wherein the act e) includes an act of: f) increasing the flow velocity of the fluid Raman medium for the last 5 passes.

8. In a Raman conversion cell containing a fluid Raman medium, a method comprising an act of:
 a) reducing a total volumetric flow of the fluid Raman medium through the Raman conversion cell while maintaining a Quality of the fluid Raman medium;
 wherein the act a) comprises an act of:
 a1) varying a flow velocity of the fluid Raman medium based on a non-uniform heat deposition in the Raman conversion cell; and
 wherein the Raman conversion cell has at least a first region and a second region occupied by the fluid Raman medium, wherein the non-uniform heat deposition is greater in the first region than in the second region, and wherein the act a) includes an act of: g) increasing the flow velocity of the fluid Raman medium in the first region with respect to the second region.

9. The method of claim 8, wherein a Stokes wavelength and a laser wavelength propagate together as essentially collinear beams along at least one path length through the fluid Raman medium, wherein the collinear beams are focused to at least one focal region along the at least one path length, wherein the first region includes the at least one focal region, and wherein the act g) includes an act of: h) increasing the flow velocity of the fluid Raman medium in the at least one focal region.

10. The method of claim 9, wherein the at least one focal region is approximately at a center of the at least one path length, and wherein the act h) includes an act of: i) shearing the flow velocity such that the flow velocity peaks at approximately the center of the at least one path length and decreases away from the center of the at least one path length.

11. An apparatus, comprising:
 a Raman conversion cell configured to contain a fluid Raman medium flowing therethrough, the Raman conversion cell being further configured to reduce a volumetric flow of the fluid Raman medium through the Raman conversion cell while maintaining a quality of the fluid Raman medium;
 the Raman conversion cell being also further configured to vary a local flow velocity of the fluid Raman medium based on a local non-uniform heat deposition in the Raman conversion cell.

12. An apparatus, comprising:
 a Raman conversion cell configured to contain a fluid Raman medium flowing therethrough, the Raman conversion cell being further configured to reduce a total volumetric flow of the fluid Raman medium through the Raman conversion cell while maintaining a quality of the fluid Raman medium;
 wherein the Raman conversion cell is configured to vary a flow velocity of the fluid Raman medium based on a non-uniform heat deposition in the Raman conversion cell; and
 wherein the Raman conversion cell is configured so as to allow the propagation through the fluid Raman medium of a Stokes wavelength and a laser wavelength, wherein the non-uniform heat deposition is proportional to a product of a first intensity of the Stokes wavelength and a second intensity of the laser wavelength in the fluid Raman medium, and wherein the Raman conversion cell is configured to vary the flow velocity of the fluid Raman medium based on the product of the first intensity and the second intensity.

13. The apparatus of claim 12, wherein the Raman conversion cell is configured to increase the flow velocity of the fluid Raman medium based on an increase of the product of the first intensity and the second intensity.

14. The apparatus of claim 12, wherein the Stokes wavelength and the laser wavelength propagate together as essentially collinear beams through the fluid Raman medium, wherein the collinear beams make N passes through the fluid Raman medium, and wherein the Raman conversion cell is configured to vary the flow velocity of the fluid Raman medium for n passes of the collinear beams, n being less than N.

15. The apparatus of claim 14, wherein the product of the first intensity and the second intensity varies with each pass of the N passes, and wherein the Raman conversion cell is configured to vary the flow velocity of the fluid Raman medium for the last n passes of the collinear beams through the fluid Raman medium.

16. The apparatus of claim 15, wherein the product of the first intensity and the second intensity increases for at least the last n passes of the collinear beams through the fluid Raman medium, and wherein the Raman conversion cell is configured to increase the flow velocity of the fluid Raman medium for the last n passes.

17. The apparatus of claim 16, wherein N=at least 25 and n=5, and wherein the Raman conversion cell is configured to increasing the flow velocity of the fluid Raman medium for the last 5 passes.

18. An apparatus, comprising:
 a Raman conversion cell configured to contain a fluid Raman medium flowing therethrough, the Raman conversion cell being further configured to reduce a total volumetric flow of the fluid Raman medium through the Raman conversion cell while maintaining a quality of the fluid Raman medium;
 wherein the Raman conversion cell is configured to vary a flow velocity of the fluid Raman medium based on a non-uniform heat deposition in the Raman conversion cell; and
 wherein the Raman conversion cell includes at least a first region and a second region occupied by the fluid Raman medium, wherein the non-uniform heat deposition is greater in the first region than in the second region, and wherein the Raman conversion cell is configured to increase the flow velocity of the fluid Raman medium in the first region with respect to the second region.

19. The apparatus of claim 18, wherein the Raman conversion cell is configured so as to allow the propagation through the fluid Raman medium of a Stokes wavelength and a laser wavelength together as essentially collinear beams along at least one path length through the fluid Raman medium, wherein the Raman conversion cell is configured to focus the collinear beams to at least one focal region along the at least one path length, wherein the first region includes the at least one focal region, and wherein the Raman conversion cell is configured to increase the flow velocity of the fluid Raman medium in the at least one focal region.

20. The apparatus of claim 19, wherein the at least one focal region is approximately at a center of the at least one path length, and wherein the Raman conversion cell is configured to shear the flow velocity such that the flow velocity peaks at approximately the center of the at least one path length and decreases away from the center of the at least one path length.

* * * * *